US009374333B2

(12) United States Patent
Roberts et al.

(10) Patent No.: US 9,374,333 B2
(45) Date of Patent: Jun. 21, 2016

(54) MEDIA CONTENT DISCOVERY AND CONSUMPTION SYSTEMS AND METHODS

(71) Applicant: Verizon and Redbox Digital Entertainment Services, LLC, Basking Ridge, NJ (US)

(72) Inventors: Brian F. Roberts, Dallas, TX (US); Joseph F. Ambeault, New York, NY (US); Shawn M. Strickland, New York, NY (US)

(73) Assignee: VERIZON AND REDBOX DIGITAL ENTERTAINMENT SERVICES LLC, Basking Ridge, NJ (US)

( * ) Notice: Subject to any disclaimer, the term of this patent is extended or adjusted under 35 U.S.C. 154(b) by 602 days.

(21) Appl. No.: 13/722,737

(22) Filed: Dec. 20, 2012

(65) Prior Publication Data

US 2014/0181218 A1 Jun. 26, 2014

(51) Int. Cl.
*H04L 12/58* (2006.01)
(52) U.S. Cl.
CPC ...................... *H04L 51/32* (2013.01)
(58) Field of Classification Search
CPC ................ G06F 17/30038; G06F 17/30017; G06F 17/30023; G06F 17/30047; H04N 21/4622; H04N 21/8358; H04N 21/23892
See application file for complete search history.

(56) References Cited

U.S. PATENT DOCUMENTS

| 8,725,829 | B2* | 5/2014 | Wang | G06Q 30/06 704/231 |
| 2005/0286498 | A1* | 12/2005 | Rand | H04M 3/42382 370/352 |
| 2007/0266065 | A1* | 11/2007 | Rosenberg | 707/205 |
| 2008/0010173 | A1* | 1/2008 | Rendich et al. | 705/28 |
| 2010/0119208 | A1* | 5/2010 | Davis et al. | 386/83 |
| 2012/0124630 | A1* | 5/2012 | Wellen | H04N 21/4334 725/109 |

* cited by examiner

*Primary Examiner* — Brian J Gillis
*Assistant Examiner* — Austin Moreau

(57) ABSTRACT

An exemplary method includes a media content discovery system 1) receiving a message addressed to a personalized destination within a media content consumption service, the message having originated outside of the media content consumption service, 2) posting information associated with the message to the personalized destination within the media content consumption service for access by a user from within the media content consumption service, 3) receiving a request provided by the user from within the media content consumption service to access the information posted to the personalized destination, and 4) providing, within the media content consumption service in response to the request, a personalized user interface that presents the posted information. Corresponding systems and methods are also disclosed.

16 Claims, 14 Drawing Sheets

MEDIA CONTENT DISCOVERY AND CONSUMPTION SYSTEMS AND METHODS

BACKGROUND INFORMATION

There are diverse ways for people to find and consume media content. For example, a person wanting to watch a movie may utilize a traditional video consumption service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

A video service typically provides a user of the service with tools for searching or browsing for video content within the service. Traditionally, the user must access the tools through the service (e.g., by accessing a user interface provided as part of and/or in conjunction with the service by a provider of the service) in order to discover and consume video content through the service. This limits the discovery of video content within the service to times and/or situations in which the user accesses the service.

However, the user may experience serendipitous media content discovery moments at times and/or in situations when accessing the service is impossible or inconvenient to the user. Unfortunately, the user may not remember the discovery moments later when the user is able to access the service, or the user may not remember sufficient details about the discovery moments to be able to conveniently find, within the service, video content associated with the discovery moments. For example, when the user accesses the service to find video content to watch, which may be referred to as a "consumption moment," the user may remember previously having a serendipitous media content discovery moment during which the user discovered a movie of interest to the user, but the user may not recall the movie and/or may not recall sufficient details to help the user find the movie within the service. This may be a source of frustration to the user, and may lead the user to spend significant time searching and/or browsing for the movie within the service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media content discovery and consumption systems and methods are disclosed herein. The systems and methods described herein may provide a media content consumption service having a personalized destination that is accessible by a user from within the media content consumption service and addressable from outside of the media content consumption service. The systems and methods described herein may receive messages that originate from outside of the media content consumption service and that are directed to the personalized destination and use the messages to personalize the media content consumption service to a user.

For example, a media content discovery system may receive a message that originated outside of the media content consumption service and that is addressed to the personalized destination within the media content consumption service. The system may post information associated with the message to the personalized destination within the media content consumption service for access by a user from within the media content consumption service. The system may receive a request provided by the user from within the media content consumption service to access the information posted to the personalized destination and provide, within the media content consumption service in response to the request, a personalized user interface that presents the posted information.

To illustrate, a user may experience a serendipitous media content discovery moment during which the user discovers a movie that is of interest to the user. The user may utilize a user computing device to generate and send, from outside of the media content consumption service, a message to a personalized destination within the media content consumption service. For instance, the user may utilize a text messaging communication service to generate and send a media messaging service ("MMS") message that contains message content related to the discovery moment (e.g., an image of a movie poster, DVD case, or other media cover art for the movie) to the personalized destination within the media content consumption service.

A media content discovery system may receive the MMS message and post information associated with the MMS message to the personalized destination within the media content consumption service for access by the user from within the media content consumption service. Subsequently, the user may access the personalized destination from within the media content consumption service and be presented with the posted information (e.g., within a personalized user interface), which the user may utilize to access and consume the movie within the media content consumption service.

These and/or other benefits provided by the disclosed exemplary media content discovery and consumption systems and methods will be made apparent herein. Exemplary systems and methods will now be described in reference to the accompanying drawings.

Figure 1:
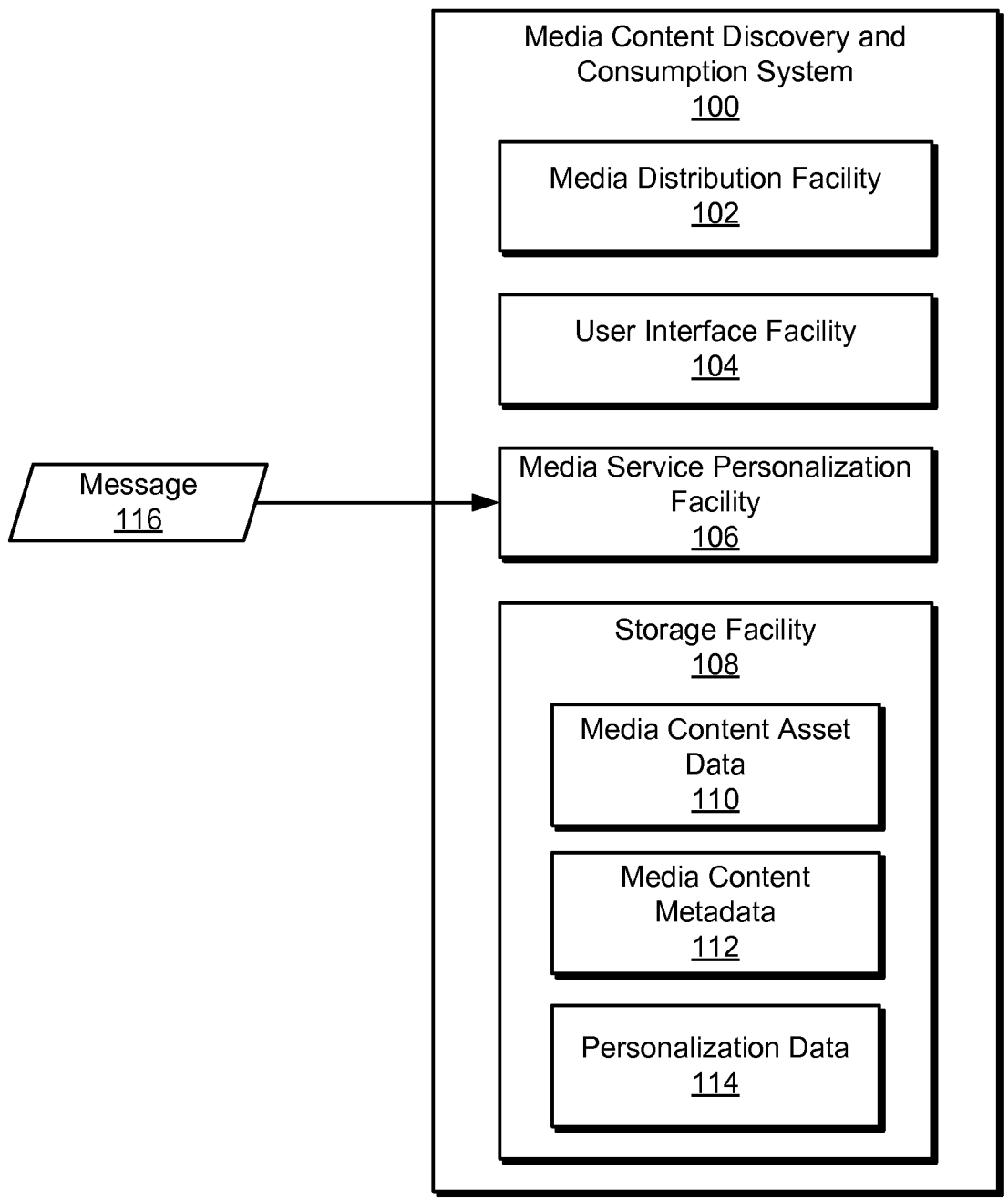
FIG. 1 illustrates an exemplary media content discovery and consumption system according to principles described herein.

FIG. 1 illustrates an exemplary media content discovery and consumption system 100 ("system 100"). System 100 may be configured to facilitate consumption of media content by one or more users. For example, system 100 may be configured to provide a media content consumption service ("media service") to one or more end-users of the media service (e.g., one or more subscribers to the media service). System 100 may be associated with (e.g., operated or provided by) a provider of the media service ("service provider"). Through the media service, a user of the media service may discover and/or consume media content in any of the ways described herein.

As used herein, the term "media content" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a media service. Such media content programs that are made available for user consumption through the media service may be referred to as "media content assets" of the media service.

As shown in FIG. 1, system 100 may include, without limitation, a media distribution facility 102, a user interface facility 104, a media service personalization facility 106 ("personalization facility 106"), and a storage facility 108 selectively and communicatively coupled to one another. The facilities may be communicatively coupled one to another by any suitable communication technologies.

Storage facility 108 may be configured to maintain media content asset data 110 representative of media content assets that may be distributed by media distribution facility 102, media content metadata 112 descriptive of the media content assets represented by media content asset data 110, and personalization data 114 generated and/or used by personalization facility 106 to personalize the media service provided by system 100 to one or more users, such as described herein. Storage facility 108 may maintain additional or alternative data as may serve a particular implementation.

Media distribution facility 102 may be configured to distribute media content assets to users. Media distribution facility 102 may be configured to distribute media content assets in any way and/or form that is suitable to facilitate consumption of the media content assets by users of the media service. In certain examples, media distribution facility 102 may be configured to distribute physical copies of media content assets to users of the media service. Additionally or alternatively, in certain examples, media distribution facility 102 may be configured to stream or download data representative of media content assets over one or more networks (e.g., Internet Protocol ("IP") networks such as the Internet).

Figure 2:
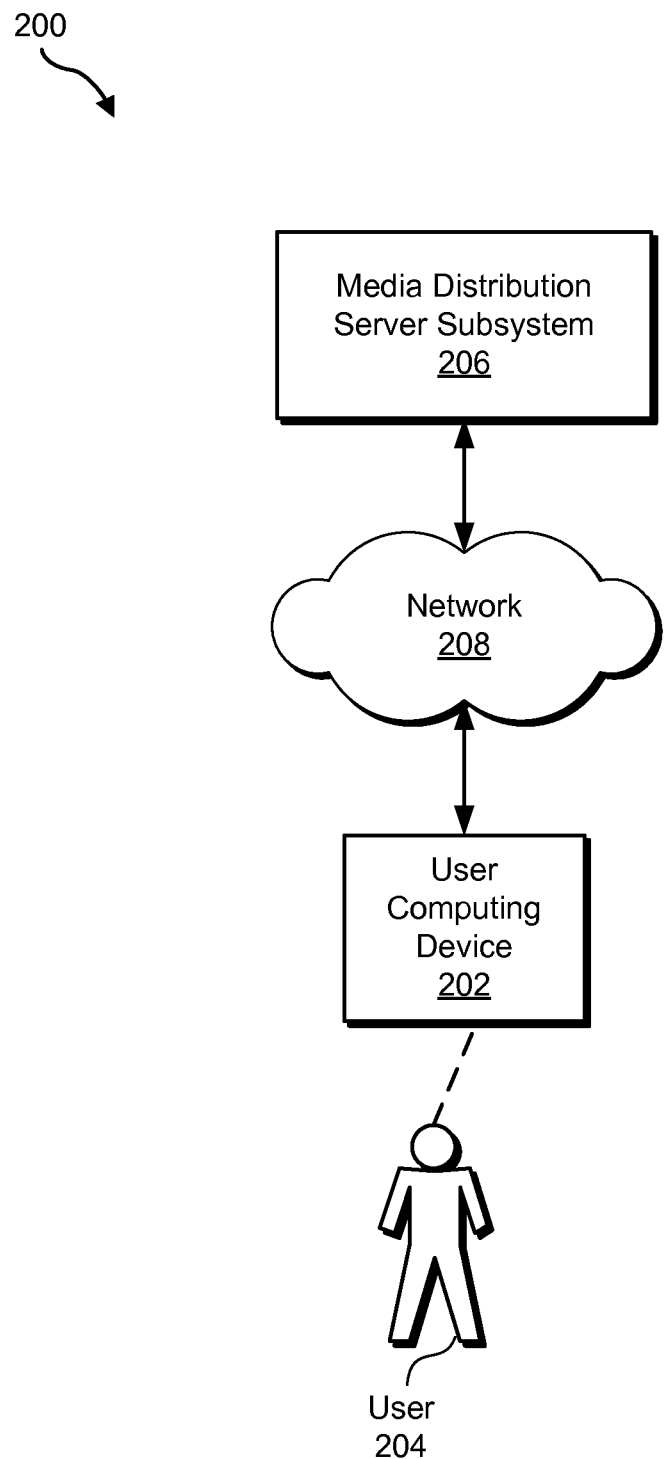
FIG. 2 illustrates an exemplary implementation of the system of FIG. 1 according to principles described herein.

FIG. 2 shows an exemplary implementation 200 of system 100. As shown, implementation 200 may include a user computing device 202 (e.g., a tablet computer, smartphone device, or any other device capable of accessing the media service and/or media content assets provided by system 100) associated with a user 204 (e.g., an end user of the media service provided by system 100). User computing device 202 may be in communication with a media distribution server subsystem 206 ("server subsystem 206"), which may include one or more computing devices (e.g., server devices remotely located from user computing device 202). In implementation 200, one or more of facilities 102-108 of system 100 may be implemented entirely by user computing device 202, entirely by server subsystem 206, or distributed across user computing device 202 and server subsystem 206 in any manner configured to facilitate user 204 accessing the media service provided by system 100.

User computing device 202 and server subsystem 206 may communicate using any communication platforms and technologies suitable for transporting data (e.g., media content data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing device 202 and server subsystem 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, the Internet, local area networks, and any other networks capable of carrying data (e.g., streaming and/or downloading media content) and/or communications signals between user computing device 202 and server subsystem 206. Communications between user computing device 202 and server subsystem 206 may be transported using any one of the above-listed networks, or any combination or sub-combination of the above-listed networks. Alternatively, user computing device 202 and server subsystem 206 may communicate in another way such as by one or more direct connections between user computing device 202 and server subsystem 206.

Server subsystem 206 may be configured to distribute media content assets to user computing device 202 for access and use by user computing device 202 to present media content assets for consumption by user 204. Server subsystem 206 may distribute media content assets to user computing device 202 as part of the media service provided by system 100 and using any suitable media streaming and/or downloading technologies (e.g., Internet media streaming and/or downloading technologies). In certain examples, the media service may comprise an online media streaming service such as an Internet streaming video service, and server subsystem 206 may be configured to stream media content assets to user computing device 202 by way of network 208.

User computing device 202 may be configured for use by user 204 to access the media service provided by system 100. For example, user 204 may utilize user computing device 202 to access one or more user interfaces provided by system 100 as part of the media service, and to present the user interfaces for use by user 204 to discover and consume media content assets distributed by server subsystem 206 as part of the media service.

Returning to FIG. 1, user interface facility 104 may be configured to provide a user interface through which users (e.g., user 204) may access and interface with the media service to discover and consume media content. The user interface may be in any suitable form. For example, user interface facility 104 may be configured to provide a website, a client application user interface (e.g., a user interface provided by a client application such as a "mobile app" installed and running on user computing device 202), a media player user interface, and/or any other form of user interface configured to facilitate interaction with the media service by a user to discover and/or consume media content within the media service. Accordingly, user 204 of user computing device 202 may utilize user computing device 202 to access a user interface provided by user interface facility 104 in order to interact with the media service to discover and/or consume media content within the media service. User interaction with the media service by way of a user interface provided by user interface facility 104 may be referred to as "in-service" user activity.

Personalization facility 106 may be configured to personalize the media service to one or more users. Personalization facility 106 may personalize the media service to a user in any suitable way. For example, personalization facility 106 may be configured to generate and/or use personalization data 114 to provide personalized information to a user of the media service. The personalized information may be defined based on a profile of the user, which may specify one or more preferences of the user, historical usage of the media service by the user, historical media content discovery and/or consumption by the user, demographic information for the user, and/or any other information that may be helpful to personalize discovery and/or consumption of media content to the user.

The personalized information associated with the user may include any information useful for personalizing the media service to the user. For example, the personalized information may specify media content assets discovered and/or consumed by the user within the media service, media content assets that are designated within the media service as being of interest to the user, media content attributes (e.g., genres, actors, topics, etc.) that are designated within the media service as being of interest to the user, and any other information about media content interests of the user.

Personalization facility 106 may be configured to provide a personalized destination that may be accessed by a user of the media service from within the media service through a user interface provided by user interface facility 104. For example, user interface facility 104 may provide a user interface such as a website or client application user interface that includes a link (e.g., a "My Service" link) to the personalized destination within the media service. For example, a link labeled "My Service" or "My [Service Name]" where a name of the media service is inserted as the service name (e.g., "My RedBox") may be displayed in a user interface and mapped to the personalized destination within the media service. In response to a user selection of the link, user interface facility 104 may access the personalized destination and provide a personalized user interface to the user. In certain examples, user interface facility 106 may require user authentication (e.g., a user account login and password) before providing the personalized user interface to the user.

Within the personalized destination, personalization facility 106 may stage information personalized to the user for access by the user, which personalized information may be presented in a personalized user interface and used by the user to discover and/or consume media content within the media service in a personalized manner. To illustrate, in certain examples, the personalized destination may include a staging area within which personalized information such as a list of media content assets that are of interest to the user (e.g., a "user wish list" or a "user watch list") may be posted. The staging area may include information representative of one or more media content assets that have been designated by the user from within the media service as being of interest to the user. For instance, through a user interface provided by user interface facility 104, the user may search and/or browse for media content. When the user finds a media content asset that is of interest to the user, the user may provide input to indicate that the media content asset is of interest to the user. In response, personalization facility 106 may post information about the media content asset to the staging area within the personalized media destination. In this or a similar manner, the personalized information included in the staging area may be determined by personalization facility 106 based on in-service user activity.

The user may access the personalized destination as described above to gain access to and use personalized information included in the staging area to access and consume media content within the media service. For example, the user may access the personalized destination and be presented with a user interface that contains a list of media content assets that have been designated as being of interest to the user. The user may use the information in the list and/or one or more tools included in the user interface to access and consume, within the media service, a media content asset included in the list.

As described above, the personalized destination provided by media service personalization facility 106 may be accessible by a user from within the media service and may include information that is personalized to the user based on in-service user activity. In addition, the personalized destination may be addressable from outside of the media service in one or more ways that allow users of user computing devices to create and send messages originating outside of the media service to the personalized destination for use by personalization facility 106 to personalize the media service to one or more users of the media service. In this or a similar manner, personalization facility 106 may personalize the media service to a user based on "out-of-service" user activity, which may include user interaction with the media service from outside of the media service. This may allow users to provide information to the media service about serendipitous media content discovery moments from outside of the media service, without having to access the media service (e.g., without accessing a user interface provided by user interface facility 104 as part of or in conjunction with the media service).

To illustrate, personalization facility 106 may receive a message 116 that originated outside of the media service provided by system 100, as shown in FIG. 1. Message 116 may be directed to (e.g., addressed to) the personalized destination provided by personalization facility 106 as part of the media service. Personalization facility 106 may receive and use message 116 to personalize the media service to a user of the media service in any of the ways described herein.

Message 116 may originate and/or be provided to system 100 from any suitable source outside of the media service provided by system 100. For example, message 116 may be generated and sent by a user utilizing a communication service and/or communication service user interface that is separate from the media service provided by system 100.

To illustrate, a user may experience a discovery moment during which the user discovers media content that is of interest to the user. The user may utilize a user computing device to generate and send, from outside of the media service, message 116 to the personalized destination within the media service. For instance, the user may generate and send an MMS message that contains message content related to the discovery moment (e.g., an image of media cover art) to the personalized destination within the media service. In this example, message 116 may be delivered to the personalized destination by way of an MMS communication service that is separate from the media service.

Figure 3:
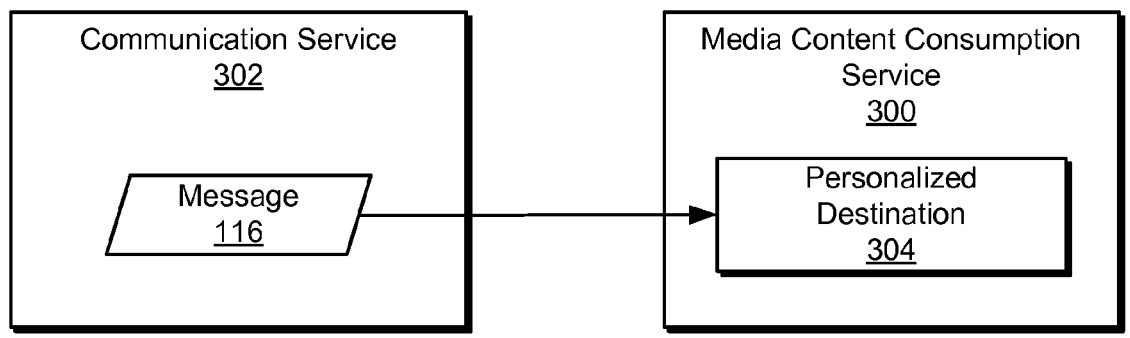
FIG. 3 illustrates an example of a media content consumption service receiving a message from a communication service according to principles described herein.

FIG. 3 illustrates an example of a media content consumption service 300 ("media service 300") provided by system 100 receiving message 116 from a communication service 302 that is separate from media service 300. More specifically, media service 300 includes a personalized destination 304 that receives message 116 from communication service 302.

Communication service 302 may include any communication service separate from media service 300 and capable of delivering message 116 to personalized destination 304 when message 116 is addressed to personalized destination 304. For example, communication service 302 may include a text messaging service (e.g., a short messaging service ("SMS") or an MMS), an email messaging service, a social network messaging service (e.g., a Twitter or a Facebook messaging service), a third-party messaging service, and/or any other communication service capable of receiving message 116 from a source outside of media service 300 and delivering message 116 to personalized destination 304 when message 116 is addressed to personalized destination 304.

Figure 4:
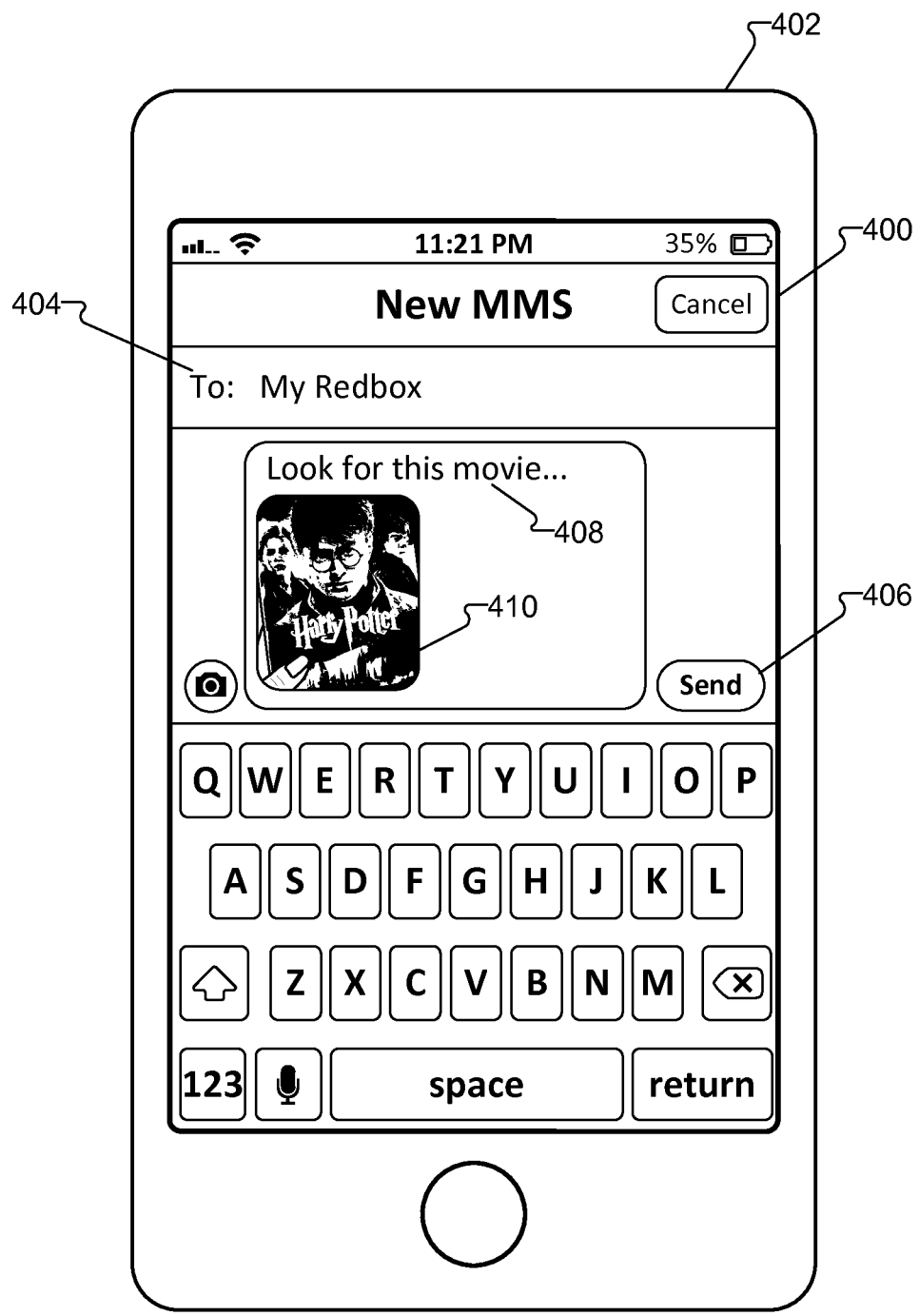
FIG. 4 illustrates an exemplary graphical user interface associated with a communication service according to principles described herein.

Message 116 may be created and sent by a user using communication service 302 and/or a user interface associated with communication service 302. For example, FIG. 4 illustrates an exemplary graphical user interface ("GUI") 400 associated with a text messaging service (e.g., an MMS) and displayed by a user computing device 402. GUI 400 may be outside of and separate from media service 300. In certain examples, GUI 400 may be provided by communication service 302 or an operating system running on user computing device 402.

As shown, GUI 400 may comprise a destination address field 404 in which a destination address may be entered by the user. The user may enter a destination address mapped to personalized destination 304. In the illustrated example, destination address field 404 contains a "my service" destination address (e.g., "My Redbox") mapped to personalized destination 304 in any manner that will cause communication service 302 to deliver the message created in GUI 400 to personalized destination 304 when the destination address is included in the destination address field 404 and the user selects a "send" option 406 to cause user computing device 402 to send the message created in GUI 400. In some examples, the destination address may be mapped to an account that a provider of media service 300 has with communication service 302.

Message 116 may contain message content configured to be used by personalization facility 106 to personalize media service 300 to a user, such as by posting information associated with the message (e.g., the message content) to personalized destination 304 for access by the user from within media service 300. For example, the message content may include, without limitation, one or more still images, photo images, video clips, audio clips, and/or textual data that may be posted by personalization facility 106 to personalized destination 304 or used by personalization facility 106 to search for associated media content (e.g., matching media content assets included in media service 300). In FIG. 4, the message being created contains textual data 408 and a photo image 410. The photo image 410 comprises a photo image of DVD case cover art for a movie. The textual data 408 comprises text that may be configured to direct personalization facility 106 to search for the movie depicted by the DVD case cover art. Additionally or alternatively, the textual data 408 may comprise text configured to be presented later within the staging area of personalized destination 304 for access by the user from within media service 300.

The content of the message being created in FIG. 4 is illustrative only. Additional or alternative message content may be included in message 116 in other examples. GUI 400 and the manner in which the user may create the message shown in GUI 400 are also illustrative only. Other user interfaces not within media service 300 may be configured to facilitate creation of message 116 in other ways. For example, such user interfaces may allow the user to create message 116 by highlighting user interface content (e.g., text or an image in a user interface) and selecting an option to send the highlighted user interface content to personalization destination 304.

Message 116 may include any type of message that may be addressed to personalized destination 304 and that may contain content useful to media service personalization facility 106 to personalize media service 300 to a user, such as message content associated with a media content discovery moment. For example, message 116 may comprise a text message (an SMS or MMS message), an email message, a social networking message, a third-party message (e.g., a message from an entity different from a provider of media service 300 and a user of media service 300), and/or any other type of message that may contain message content associated with a media content discovery moment and/or useful to personalization facility 104.

In certain examples, the user who creates and sends message 116 may be the same user to whom personalization facility 106 personalizes media service 300 based on message 116. For example, a particular user may use GUI 400 to create and send message 116 addressed to personalized destination 304. Media service personalization facility 106 may receive message 116 from communication service 302 and resolve message 116 to a user account associated with the user. This may be accomplished in any suitable way, such as by personalized destination 304 using information included in message 116 about the user, the user computing device used by the user to send message 116, and/or an account of the user with communication service 302 to identify a matching user account in media service 300 for the user. Alternatively, personalized destination 304 may be specific to the user, and personalization facility 106 may resolve any messages addressed to personalization destination 304 to be associated with the account of the user with media service 300.

Additionally or alternatively, the user who creates and sends message 116 may be a different user than the user to whom personalization facility 106 personalizes media service 300 based on the message. For example, a user of media service 300 may specify within media service 300 that a friend of the user (or any other person) is granted permission to send messages to the user's account within media service 300 by way of personalized destination 304. The friend may use GUI 400 to create and send message 116 addressed to personalized destination 304. Personalization facility 106 may receive message 116 from communication service 302 and resolve message 116 to the account of the user who granted the friend permission to send messages to the user by way of personalized destination 304. This may be accomplished in any suitable way, such as by personalized destination 304 using information included in message 116 about the user and/or the user's friend, the user computing device used by the friend to send message 116, and/or an account of the user and/or the user's friend with communication service 302 to identify a matching user account in media service 300 for the user. Alternatively, personalized destination 304 may be specific to the user, and personalization facility 106 may resolve any messages addressed to personalization destination 304 to be associated with the account of the user with media service 300.

Additionally or alternatively, a third party such as an entity other than the user and provider of media service 300 may provide message 116 to personalized destination 304 for use by personalization facility 106 to personalize media service 300 to the user of media service 300. For example, a movie theater system may be configured to generate and send message 116 to personalized destination 304 in response to an occurrence of a predefined event at a movie theater, such as the user purchasing tickets to a particular movie or checking in to watch a particular movie. In response to the purchase or check-in, the movie theater system may generate and send message 116 containing information about the purchase or check-in to personalized destination 304 for use by personalization facility 106 to personalize media service 300 to the user. As another example, a third-party retail store system may be configured to generate and send message 116 to personalized destination 304 in response to an occurrence of a predefined event at a retail store, such as the user purchasing a media content program. Other third-party systems may be similarly configured to generate and send message 116 to personalized destination 304 in response to predefined events.

Additionally or alternatively, personalization facility 106 may be configured to monitor for predefined events within communication service and personalizing media service 300 to a user based on the events. For example, personalization facility 106 may monitor a social networking service for events such as uploads of content to a social network site that are related to media content (e.g., a user posting social network content about a movie) and/or sending or receiving of social network messages that are related to media content (e.g., a "tweet" sent or received by a user and about a movie).

Figure 5:
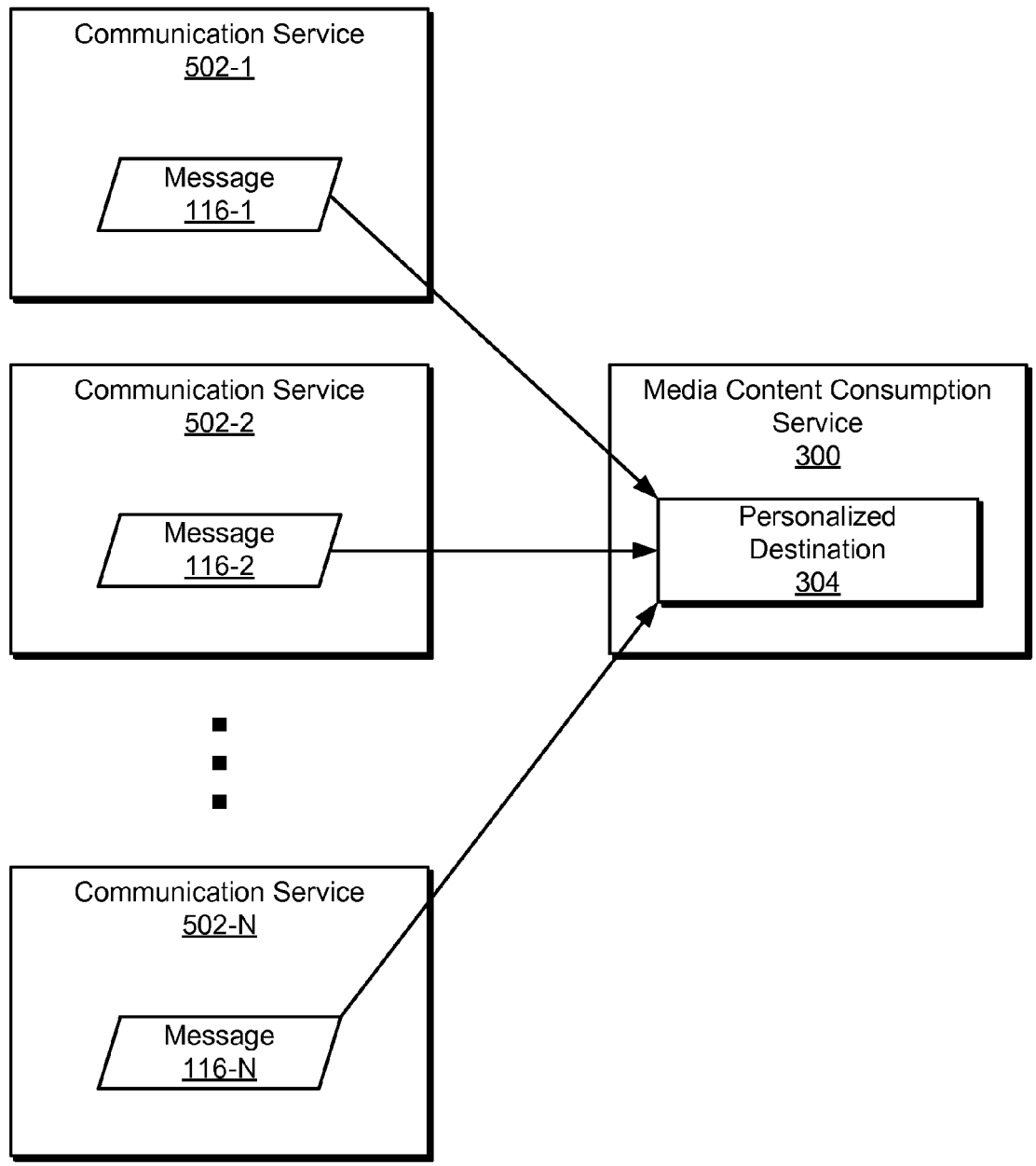
FIG. 5 illustrates an example of a media content consumption service receiving messages from multiple communication services according to principles described herein.

In certain examples, personalized destination 304 may be addressable by multiple communication services. To illustrate, FIG. 5 shows an example of media service 300 receiving messages 116 (e.g., messages 116-1 through 116-N) addressed to personalized destination 304 from multiple communication services 502 (e.g., communication services 502-1 through 502-N).

Communication services 502 may be of different types, such as by being separate one from another, by using different messaging platforms and/or message types, and/or by having any other distinguishing attributes. For example, communication service 502-1 may comprise a text messaging service, communication service 502-2 may comprise an email messaging service, and communication service 502-N may comprise a social networking messaging service. Accordingly, in some examples, a user of communication services 502 may be able to select which of the communication services 502 to use to send a message 116 to personalized destination 304.

Figure 6:
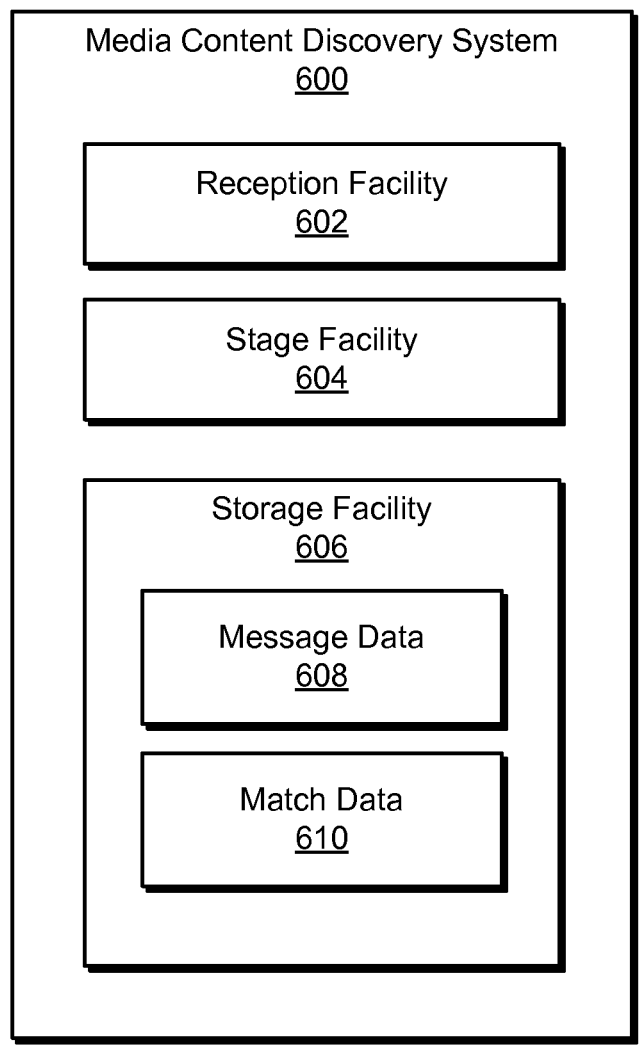
FIG. 6 illustrates an exemplary media content discovery system according to principles described herein.

In any of the ways described above, message 116 originating outside of media service 300 may be generated and sent to personalized destination 304 within media service 300. Personalization facility 106 may be configured to use message 116 originating outside of media service 300 and sent to personalized destination 304 to personalize media service 300 to a user. FIG. 6 illustrates as exemplary media content discovery system 600 ("system 600"), which may be implemented by system 100 (e.g., by personalization facility 106 of system 100), and/or one or more elements of implementation 200 of system 100. As shown, system 600 may include, without limitation, a message facility 602, a stage facility 604, and a storage facility 606 selectively and communicatively coupled to one another. The facilities may be communicatively coupled one to another by any suitable communication technologies.

Message facility 602 may be configured to receive messages originating outside of media service 300 and directed to personalized destination 304. As described above, such messages may have various and/or unconstrained message formats, contents, and/or other attributes and may be received by way of one or more distinct communication services 302. Message facility 602 may be configured to process such messages, which processing may include detecting and parsing messages of different and/or unconstrained types, and detecting and processing the contents of such messages. To illustrate, message facility 602 may be configured to detect that a particular message is an MMS message, detect that the content of the message contains text and an image, and preprocess the message, text, and image for use in personalizing media service 300 to a user (e.g., by resolving a message to a particular user account, converting data formats, obtaining data for further processing, etc.). Message data 608 stored in storage facility 606 may be generated by message facility 602 in relation to such processing of received messages and may represent the received messages, message content, and/or data obtained from processing the messages.

Stage facility 604 may be configured to post information associated with messages received by message facility 602 to personalized destination 304 for access by users from within media service 300. The posted information may include any information associated with a message such as message 116, including, but not limited to, information indicating a source from which the message was received (e.g., a user from whom the message was received), a communication service from which the message was received, a message type for the message, content included in the message, send and/or receive times for the message, and any other information about the message.

Additionally or alternatively, the posted information associated with the message may include any information derived by stage facility 604 based on the message. For example, stage facility 604 may be configured to use the message (e.g., content of the message) to search within media service 300 for media content assets having an association with the message (e.g., with the message content). This may include using message content to search media content asset data 110 and/or media content metadata 112 to identify, from within a library of media content assets available for consumption with media service 300, any media content assets having an association with the message content.

Figure 7:
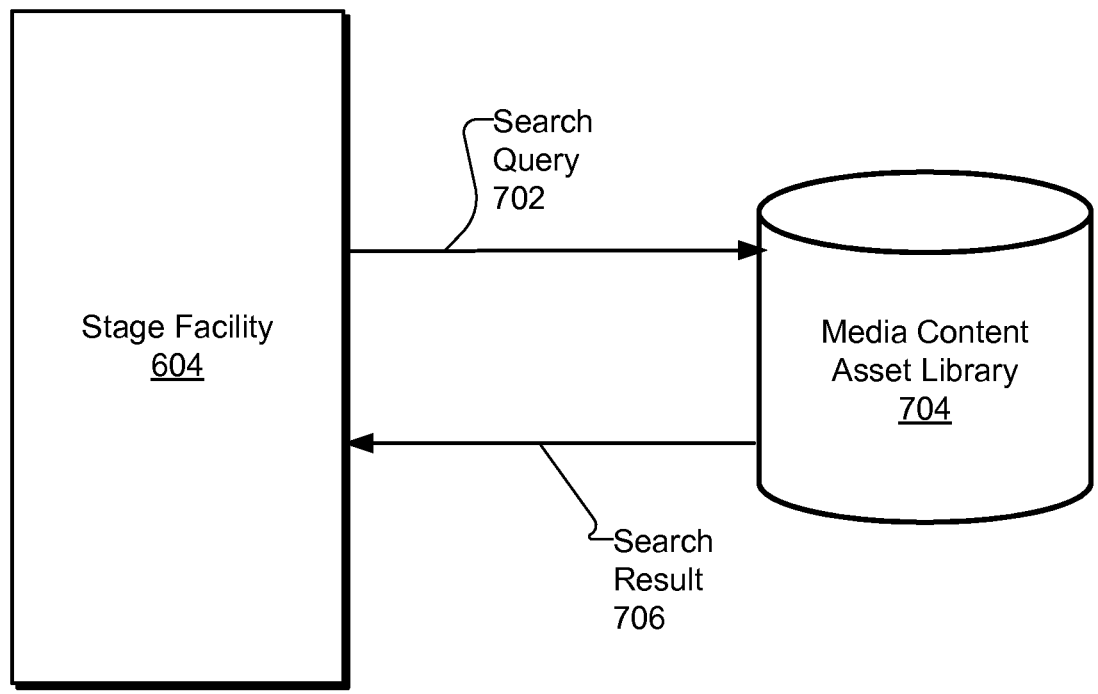
FIG. 7 illustrates an exemplary search of a media content asset library according to principles described herein.

To illustrate, FIG. 7 shows stage facility 604 sending a search query 702 to a media content asset library 704 and receiving a search result 706 back from media content asset library 704. The search result 706 may indicate any media content assets included in library 704 that are found to be associated with the terms of the search, which terms may include message content included a message received by message facility 602. Alternatively, the search result 706 may indicate that no media content assets in library 704 were found to be associated with the terms of the search.

As an example, message 116 may include the text message created as illustrated in FIG. 4. Stage facility 604 may use the photo image 410 included in the text message to search media content asset library 704 for media content assets associated with the photo image 410. If a match is found, the search result 706 may include an indication (e.g., a title) of the matching media content asset. If no match is found, the search result 706 may indicate that no match is found.

From search results 706, stage facility 604 may be configured to identify any matching media content assets based on a predefined match heuristic, which may be represented as match data 610 stored in storage facility 606. The match heuristic may specify one or more criteria for a determination that a media content asset matches message content included in a message. The criteria may be defined as may serve a particular implementation and/or application. Stage facility 604 may include an analytics engine configured to analyze a message, message content, search results, and match heuristic to identify when a media content asset is a match for message content.

Figure 8:
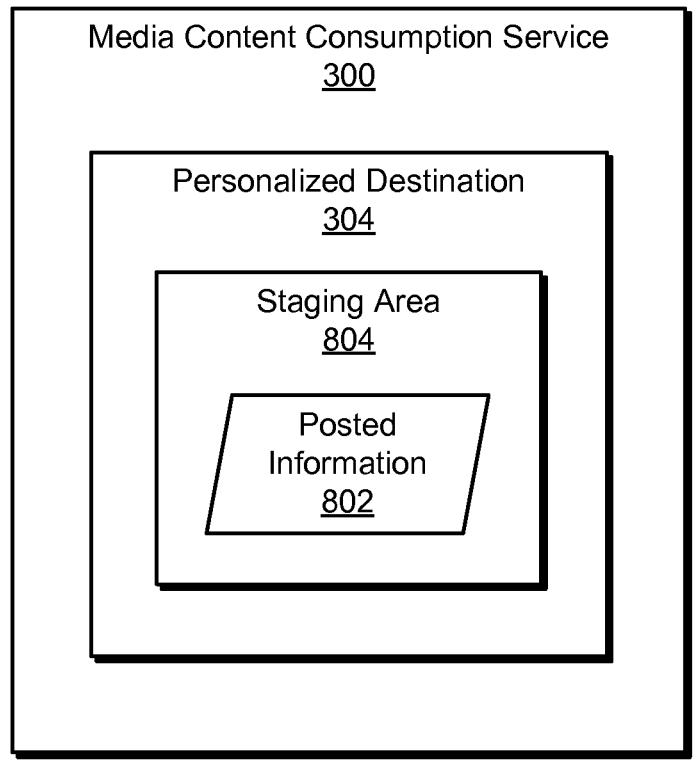
FIG. 8 illustrates an example of posted information included in a staging area within a personalized destination of a media service according to principles described herein.

In certain examples, stage facility 604 may be configured to post information associated with messages received by message facility 602 to a staging area within personalized destination 304 for access by users from within media service 300. FIG. 8 illustrates posted information 802 included in a staging area 804 within personalized destination 304 of media service 300.

The staging area 804 within personalized destination 304 to which information 802 is posted by stage facility 604 may include any data structure or set of data structures that include personalized data that is specific to a user. For example, the staging area 804 may include a list of externally-originated messages received by message facility 602 and associated with the user, a list of media content assets designated as being of interest to the user, a list of instances of message content included in externally-originated messages received by message facility 602 (e.g., a list of photo images included in the messages), and any other data structure containing personalized data specific to the user.

The posting of information 802 to staging area 804 by stage facility 604 may configure the information 802 for presentation to a user when the user accesses personalized destination 304 from within media service 300. For example, information 802 posted to staging area 804 may be ready for use by user interface facility 104 of system 100 to populate one or more personalized user interfaces that may be presented to a user who accesses personalized destination 304 from within media service 300.

To illustrate, user interface facility 104 of system 100 may receive a request provided by the user from within media service 300 (e.g., from within a user interface provided by user interface facility 104 as part of media service 300) to access information 802 posted to personalized destination 304. The request may be made by the user from within media service 300 in any suitable way, such as by providing input within a user interface provided by user interface facility 104 to request access to personalized destination 304 and/or to specific information included in personalized destination 304.

In response to the request, user interface facility 104 may provide, within media service 300, a personalized user interface that presents posted information 802. The in-service personalized user interface may be accessible to a user at personalized destination 304, and user interface facility 104 may access and use posted information 802 to populate the personalized user interface.

The personalized user interface may include any of the examples of posted information 802 described herein. As an example, the personalized user interface may include a list of media content assets designated as being of interest to a user, with one or more of the media content assets being designated as being of interest to the user by stage facility 604 and/or personalization facility 106 based on one or more messages that originated outside of media service 300 and were received by message facility 602. As another example, the personalized user interface may include a list of messages that originated outside of media service 300 and were received by message facility 602. As another example, the personalized user interface may include posted information 802 specific to a particular message that originated outside of media service 300 and was received by message facility 602.

Exemplary in-service personalized user interfaces in the form of GUIs that may be provided by user interface facility 104 for display to a user accessing personalized destination 304 and that may include posted information 802 will now be described.

Figure 9:
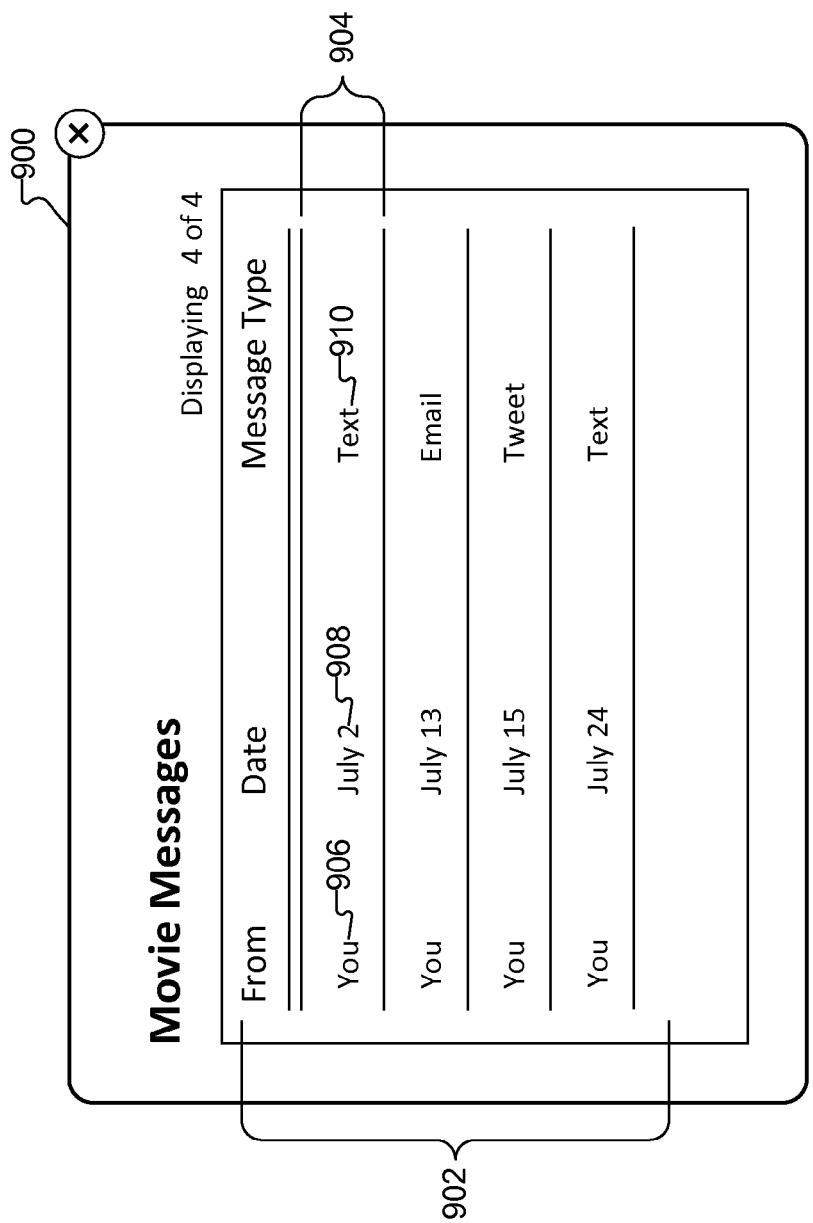
FIGS. 9-11 illustrate exemplary graphical user interfaces according to principles described herein.

FIG. 9 illustrates an exemplary GUI 900 that includes posted information in the form of a list 902 of messages addressed to personalized destination 304 from outside of media service 300 and received by message facility 602. As shown, list 902 may include information associated with each message, such as an indication of a source of each message, a date that each message was received, and a type for each message. For example, entry 904 in list 902 represents a particular message and includes an indication 906 that the message was received from the same person who is accessing GUI 900, an indication 908 that the message was received on July 2, and an indication 910 that the message is a text message.

While GUI 900 illustrates list 902 to include only messages from the same user who is accessing GUI 900, this is illustrative only. Other examples of list 902 may include a combination of messages received from the same user who is accessing GUI 900 and one or more other users who have been granted permission by the user to send messages from outside of media service 300 to personalized destination 304 for the user. Other examples of list 902 may include only messages received from one or more users other than the user who is accessing GUI 900, the other users having been granted permission by the user to send messages from outside of media service 300 to personalized destination 304 for the user.

Figure 10:
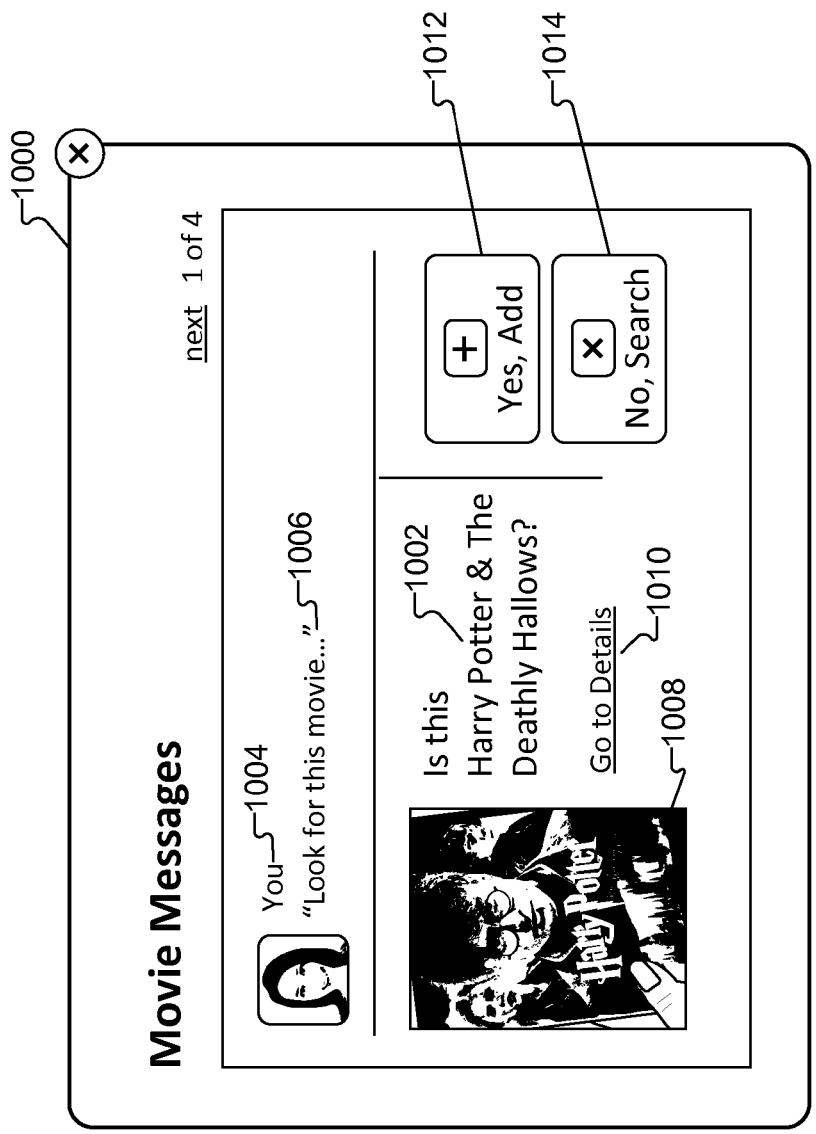

The user accessing GUI 900 may provide input to select an entry from list 902. For example, the user may select entry 904 from list 902. In response, user interface facility 104 may provide GUI 1000 illustrated in FIG. 10 for display to the user. As shown in FIG. 10, GUI 1000 may present posted information associated with the message represented by entry 904 in list 902. In the illustrate example, the message represented by entry 904 comprises a text message, the creation of which is illustrated in FIG. 4.

As shown in FIG. 10, GUI 1000 may include information about a media content asset determined by stage facility 604 to match the content of the text message. In the illustrated example, the information includes a title 1002 of a movie known as "Harry Potter & The Deathly Hallows." Alternatively, if no match is found, instead of an indication of a matching media content asset, GUI 1000 may include information indicating that no match was found.

In addition to the title 1002 of the matching movie, GUI 1000 may include information associated with the text message. For example, GUI 1000 may include an indication 1004 of the source of the text message (e.g., "You" in GUI 1000 indicates that the source of the text message is the same user who is accessing GUI 1000 from within media service 300). In FIG. 10, GUI 1000 further includes data representing content of the text message. In particular, GUI 1000 displays an indication 1006 of the text included in the text message and an indication 1008 of the photo image included in the text message. GUI 1000 may also include a link 1010 configured to be selected by the user to access additional information about the matching movie, the text message, and/or a search and/or results of a search associated with the text message.

In certain examples, message content included in a message may be actionable within media service 300. As an example, message content included in a message may become an actionable link within a personalized user interface such as GUI 1000. To illustrate, the text of a message may include a word that is an actionable keyword within media service 300. Stage facility 604 may recognize the word as an actionable keyword and make the word a user-selectable link within posted information 802 in a personalized user interface such that the user may select the link to direct system 100 and/or system 600 to perform one or more actions associated with the link.

As another example, a message may include a quotation from a movie. Stage facility 604 may detect that the message contains the quotation and process the quotation as an actionable item that is used to search for a matching movie within media service 300 and/or is provided as a user-selectable link within posted information 802 in a personalized user interface such that the user may select the link to direct system 100 and/or system 600 to perform one or more actions associated with the link (e.g., searching for a matching movie within media service 300).

As another example, a message may include a photo and location data (e.g., Global Positioning System ("GPS") data) associated with the photo and specifying a geographic location such as the geographic location at which the photo was captured. Stage facility 304 may be configured to use the location associated with the photo to identify media content assets that are associated with the location associated with the photo. For example, stage facility 604 may be configured to search within media service 300 for media content assets associated with the same geographic location (e.g., the same city) to which the photo is associated. In some examples, the results of such a search may include one or more movies that were shot at or within a predefined distance of the geographic location associated with the photo.

In certain implementations, the location data for the photo may be actionable within media service 300. Stage facility 604 may detect that the message contains the location data and process the location data as an actionable item that is used to search for a matching movie within media service 300 and/or is provided as a user-selectable link within posted information 802 in a personalized user interface such that the user may select the link to direct system 100 and/or system 600 to perform one or more actions associated with the link (e.g., searching for a matching movie within media service 300).

GUI 1000 may further include options configured to be selected by the user. For example, GUI 1000 may include an option 1012 configured to be selected by the user to direct personalization facility 106 to add the matching movie to a list of media content assets that are of interest to the user. GUI 1000 may also include an option 1014 configured to be selected by the user to direct personalization facility 106 not to add the matching movie to the list but to instead present the user with tools for creating a supplemental search associated with the text message.

For example, if the matching movie indicated in GUI 1000 is not the movie in which the user is interested (e.g., the user text messaged the photo image to prompt the user to search for a related movie instead of the movie represented by the photo image), the user may select option 1014 to access and use one or more supplemental search tools to define and initiate a supplemental search.

Figure 11:
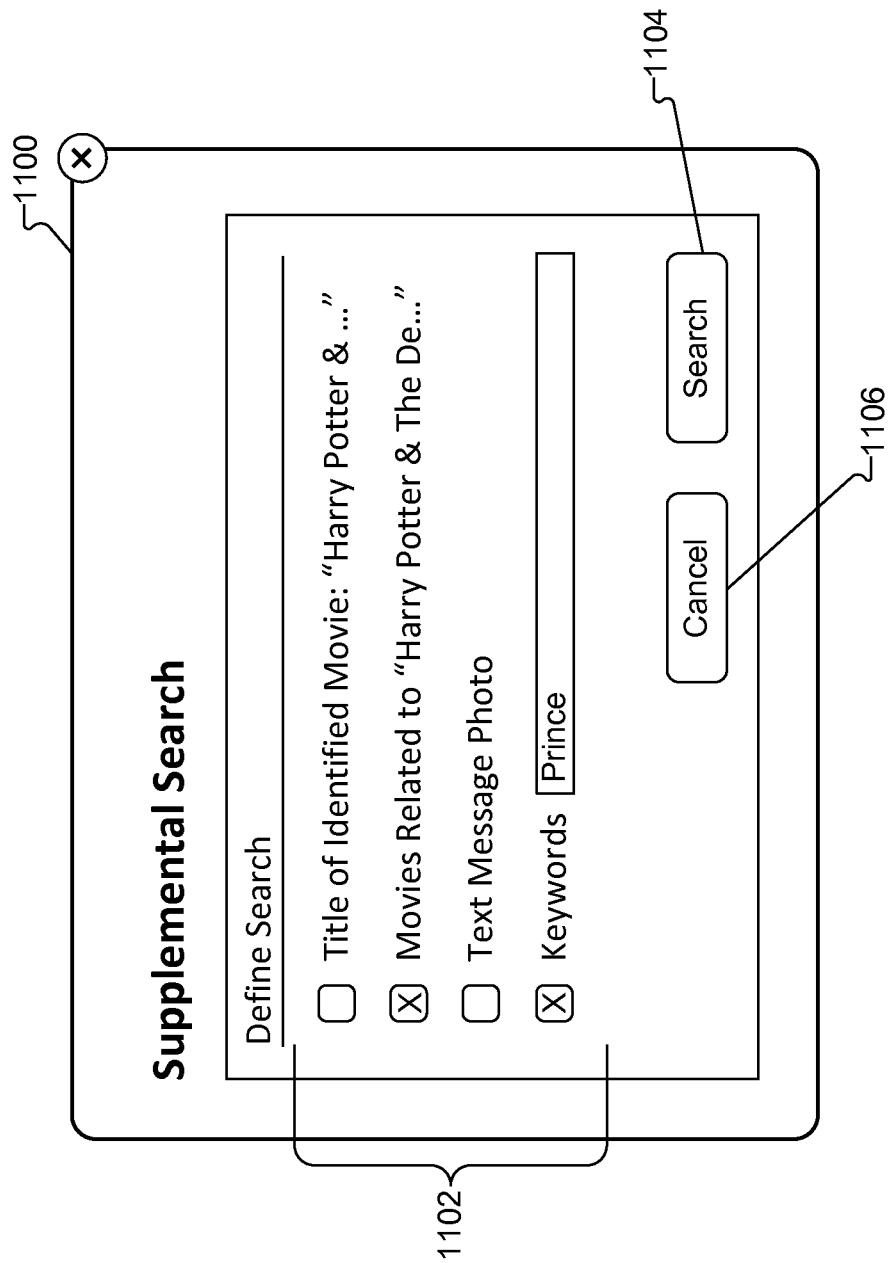

FIG. 11 illustrates an exemplary GUI 1100 that may be provided for display by user interface facility 104 in response to a user selection of option 1014 in GUI 1000. As shown, GUI 1100 may include tools for use by the user to define and initiate a supplemental search. For example, GUI 1100 may include a list 1102 of options configured to be selected by the user to define a search. In the illustrated example, the options include an option to use the title of the identified movie (e.g., "Harry Potter & The Deathly Hallows") as a search term, an option to search for movies related to the identified movie (e.g., movies with matching attributes such as movies in a series of movies, movies having the same director, movies having the same actors, etc.), an option to use message content (e.g., photo image 1008) as one or more search terms, and an option to use one or more user-provided keywords as search terms. In FIG. 11, the user has selected to search for movies related to the "Harry Potter & The Deathly Hallows" movie and that have an association with the keyword "prince."

With one or more of the options in list 1102 selected, the user may select a "search" option 1104 to initiate the search in accordance with the selected options. Stage facility 604 may then search the media content asset library of media service 300 for matching media content assets. User interface facility 104 may present the results of the search in another GUI. Alternatively to initiating the search, the user may select a "cancel" option 1106 in GUI 1100 to cancel the supplemental search.

To illustrate an example, a user of media service 300 may use a user computing device such as a mobile phone to create and send the text message represented in FIG. 4 to personalized destination 304 from outside of media service 300. For example, the user may come across a DVD case for a movie that is of interest to the user (e.g., a DVD case at a retail store or at a friend's house). The user may be interested in consuming the movie through media service 300, but at a later time. Accordingly, the user may utilize the mobile phone to capture a photo of the DVD case and to create and send the text message containing the photo image of the DVD case to personalized destination 304.

Message facility 602 may receive and process the text message, such as described herein. Stage facility 604 may search within media service 300 for media content assets associated with the content of the text message, such as for media content assets associated with the content of the photo image included in the message. Stage facility 604 may determine from results of the search that a movie titled "Harry Potter & The Deathly Hallows" is associated with the content of the photo image included in the text message. Stage facility 604 may post information about the matching movie to the staging area 804 of personalized destination 304 associated with the user for access by the user from within media service 300.

Subsequently, the user may access personalized destination 304 from within media service 300 and be presented with information associated with the text message and that has been posted to staging area 804. For example, GUI 900 or 1000 may be displayed. If the user wants to add the identified movie to a list of media content assets that are of interest to the user, the user may select option 1012 in GUI 1000. In response, personalization facility 104 may add the movie to the list.

As another example, the user may have come across the same DVD case and used the photo image of the DVD case to prompt the user to search for another movie related to the DVD case movie. In this example, when GUI 1000 is displayed, the user may select the search option 1014 to launch GUI 1100, within which the user may define and initiate a search for the movie related to the DVD case movie and that is of interest to the user. For example, the user may be interested in consuming a movie titled "Harry Potter & The Half-Blood Prince" within media service 300. The user may define the supplemental search accordingly such that the results of the supplemental search will contain the movie of interest to the user.

The examples of serendipitous media content discovery moments and corresponding external communications addressed to personalized destination 304 of media service 300 described herein are illustrative only. Additional and/or alternative discovery moments and corresponding external communications addressed to personalized destination 304 of media service 300 may be supported by principles described herein.

As an example, a user may see a movie poster advertising a particular movie that is of interest to the user. At this discovery moment, the user may utilize a user computing device such as a mobile phone device to capture a photo image of the movie poster and to generate and send a message that includes the photo image of the movie poster to personalized destination 304 of media service 300. Subsequently, when the user is in a position to access media service 300, posted information related to the discovery moment will be available to the user to use to discover and/or consume the movie or other related media content assets.

As another example, a user may hear a song being played at a particular location (e.g., at a party). Hearing the song may remind the user that the song is part of a movie that the user has previously watched. The user may not remember which movie the song reminds him of and may want to discover and/or consume the movie again. At this discovery moment, the user may utilize a user computing device such as a mobile phone device to capture an audio clip of the song and to generate and send a message that includes the audio clip of the song to personalized destination 304 of media service 300. Subsequently, when the user is in a position to access media service 300, posted information related to the discovery moment will be available to the user to use to discover and/or consume the movie or other related media content assets.

In certain examples, when stage facility 604 identifies a media content asset to be a match to message content of an externally-originated message, stage facility 604 may be configured to automatically add information 802 about the media content asset to a list of media content assets designated as being of interest to a user. In certain examples, stage facility 604 may first prompt the user for input to confirm that the identified media content asset is of interest to the user before adding information 802 about the media content asset to the list of media content assets designated as being of interest to a user.

In certain examples, stage facility 604 may not find any matching media content assets for an externally-originated message. In such examples, stage facility 604 may be configured to post information 802 about the message for access and use by the user from within media service 300. The user may then be able to use the information 802 as a starting point to locate media content assets within media service 300 that are of interest to the user.

In certain examples, stage facility 604 may be configured to auto-learn based on feedback from a user. For example, stage facility 604 may use messages received by message facility 602, posted information 802 associated with the messages, and/or user input provided in relation to the posted information 802 to adjust operations of stage facility 602 and/or personalization facility 106 to adapt and improve the effectiveness of stage facility 604 in finding media content assets that are of interest to the user.

Figure 12:
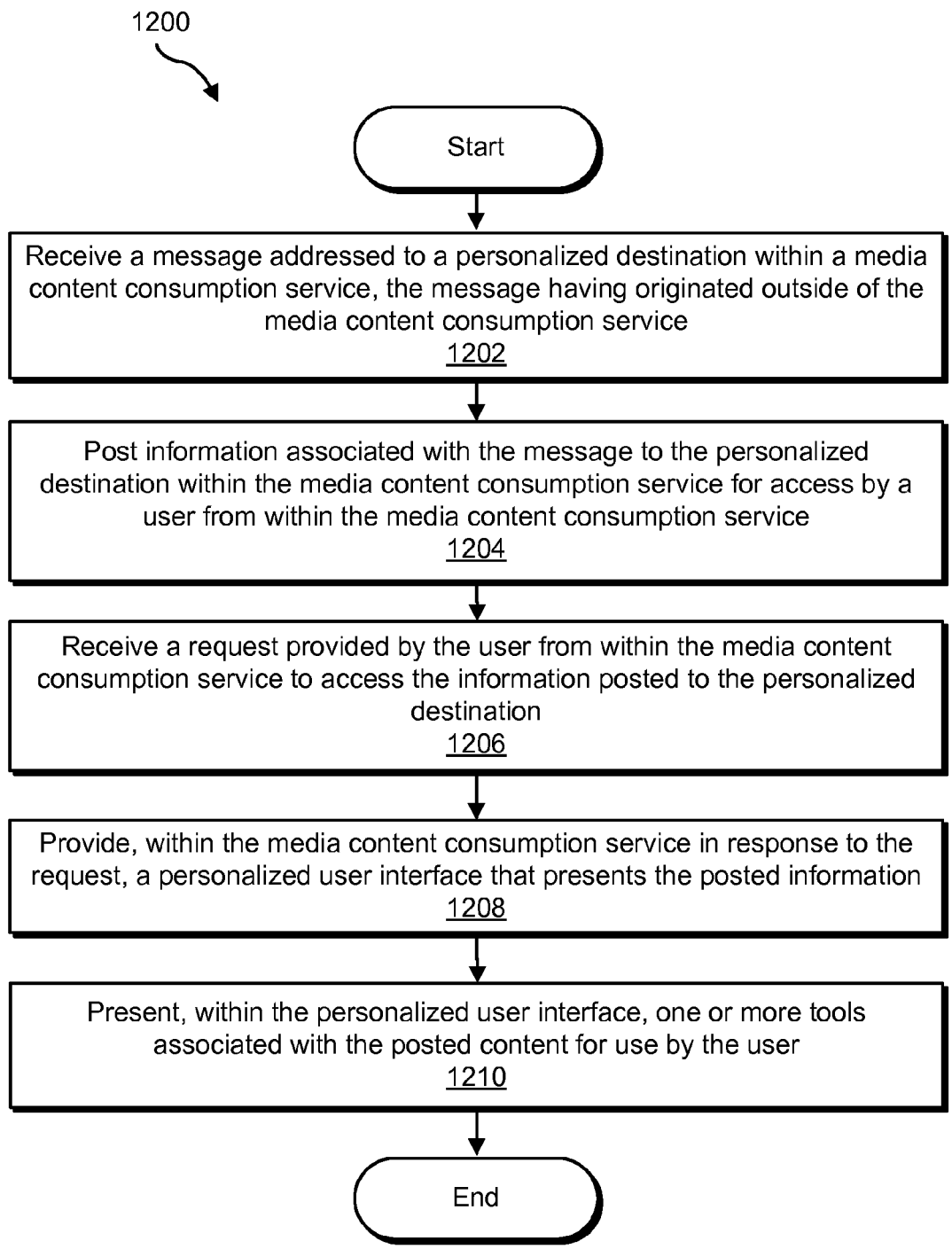
FIGS. 12-13 illustrate exemplary media content discovery and consumption methods according to principles described herein.
Figure 13:
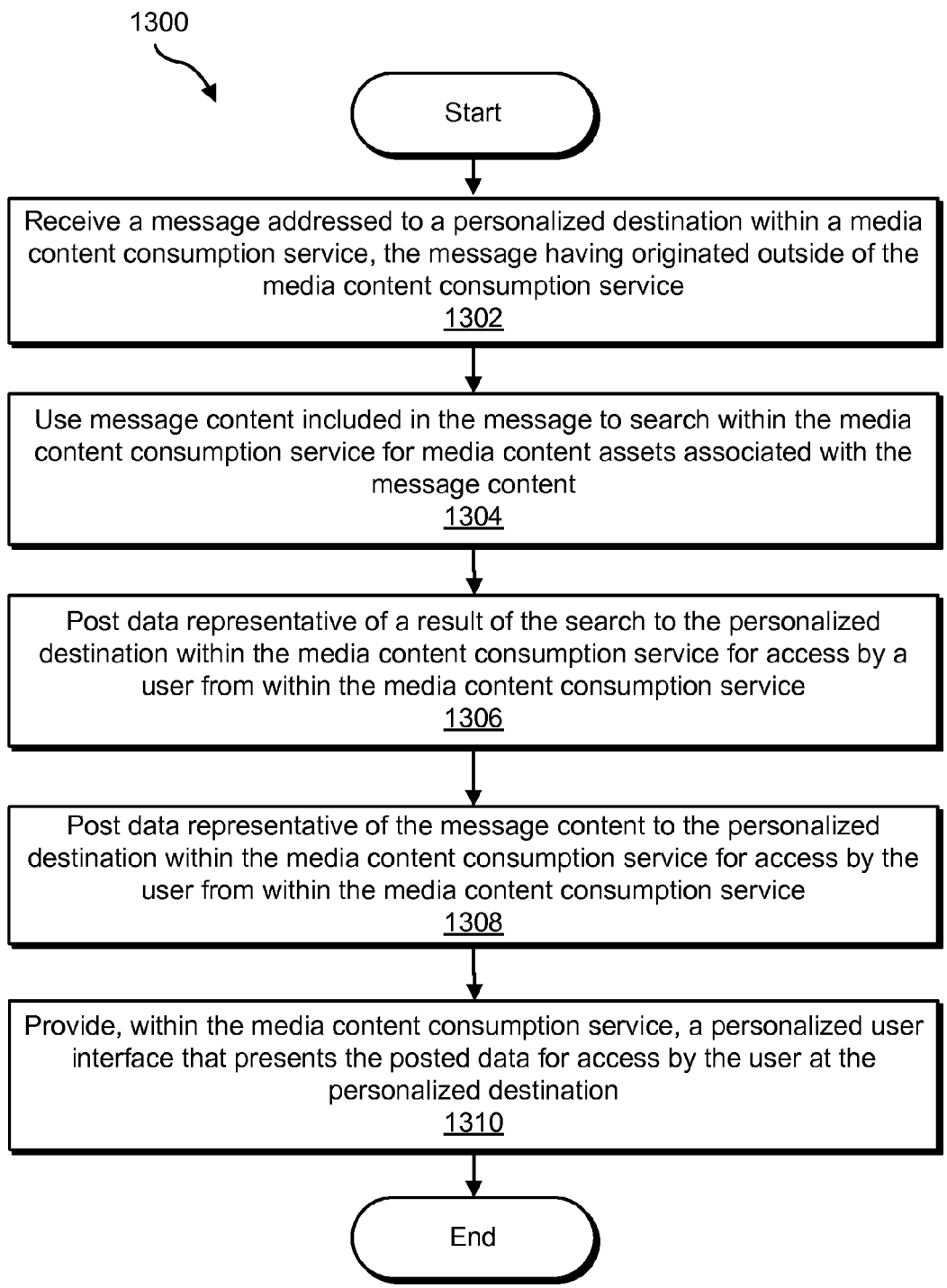

FIGS. 12-13 illustrate exemplary media content discovery and consumption methods 1200 and 1300, respectively, according to principles described herein. While FIGS. 12-13 illustrate exemplary steps according to certain embodiments, other embodiments may omit, add to, reorder, combine, and/or modify any of the steps shown in FIGS. 12-13. In certain embodiments, one or more of the steps shown in FIGS. 12-13 may be performed by system 100, system 600, and/or one or more components or implementations of system 100 and/or system 600.

Turning to FIG. 12, in step 1202 of method 1200, a media content discovery system ("the system") receives a message addressed to a personalized destination within a media content consumption service, the message having originated outside of the media content consumption service. Step 1202 may be performed in any of the ways described herein.

In step 1204, the system posts information associated with the message to the personalized destination within the media content consumption service for access by a user from within the media content consumption service, such as described herein.

In step 1206, the system receives a request provided by the user from within the media content consumption service to access the information posted to the personalized destination, such as described herein.

In step 1208, the system provides, within the media content consumption service in response to the request received in step 1206, a personalized user interface that presents the posted information. Step 1208 may be performed in any of the ways described herein. For example, GUIs 900, 1000, or 1100 may be provided for display in step 1208.

In step 1210, the system presents, within the personalized user interface, one or more tools associated with the posted information for use by the user. The tools may include any of the exemplary tools described herein, such as one or more of the tools illustrated in GUIs 900, 1000, and/or 1100.

Turning to FIG. 13, in step 1302 of method 1300, a media content discovery system ("the system") receives a message addressed to a personalized destination within a media content consumption service, the message having originated outside of the media content consumption service. Step 1302 may be performed in any of the ways described herein.

In step 1304, the system uses message content included in the message to search within the media content consumption service for media content assets associated with the message content, such as described herein.

In step 1306, the system posts data representative of a result of the search to the personalized destination within the media content consumption service for access by a user from within the media content consumption service, such as described herein.

In step 1308, the system posts data representative of the message content to the personalized destination within the media content consumption service for access by the user from within the media content consumption service, such as described herein.

In step 1310, the system provides, within the media content consumption service, a personalized user interface that presents the posted data for access by the user at the personalized destination. Step 1310 may be performed in any of the ways described herein and may present the posted data representative of the results of the search, the posted data representative of the message content, and/or any other posted data associated with the message received in step 1302.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 14:
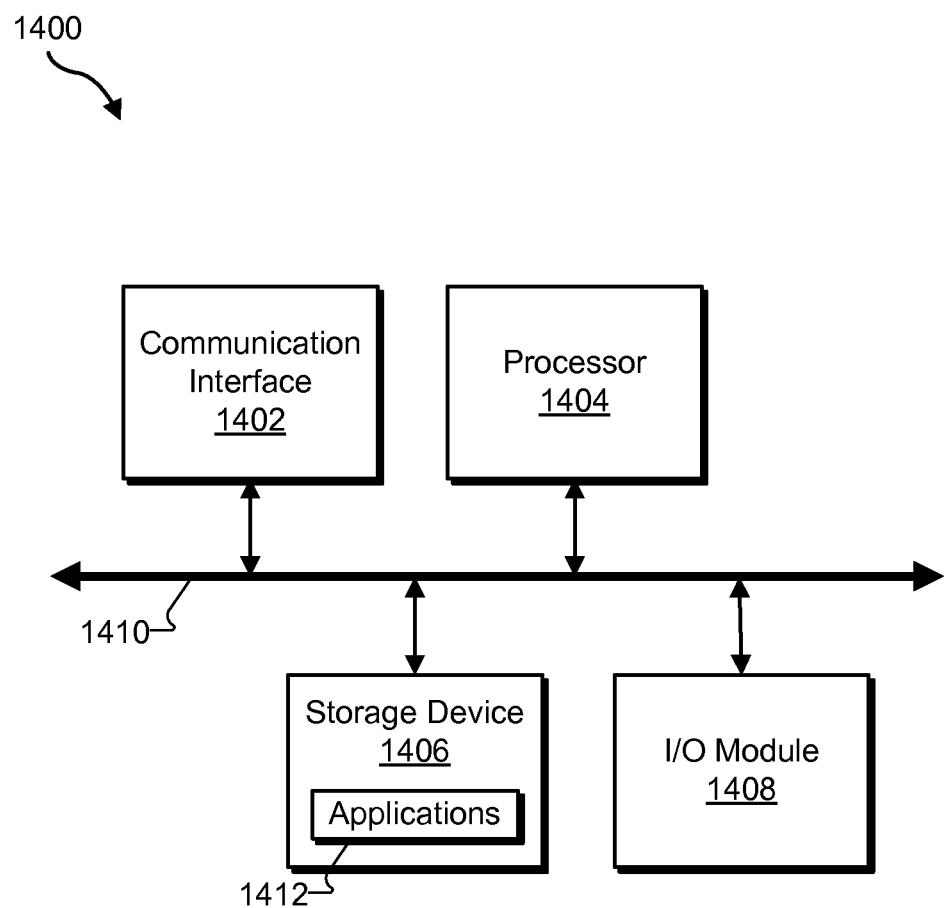
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, and any other suitable interface. Communication interface 1402 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1402 may be configured to interface with any suitable communication media, protocols, and formats.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another non-transitory computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with one or more of the facilities described herein. Likewise, any of the storage facilities described herein may be implemented by or within storage device 1406.

In any of the ways described herein, data associated with a media content discovery moment outside of a media service may be provided to the media service and used to assist a user with a subsequent media content discovery and/or consumption moment within the media service.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a media content discovery system from a user that has been granted permission by an additional user to send messages to a personalized destination of the additional user within a media content consumption service, a message that is for the additional user and that is addressed to the personalized destination within a media content consumption service, the personalized destination being addressable via multiple communication services utilizing different messaging platforms, the message having originated outside of the media content consumption service and including message content that comprises one of a photo image, a video clip, and an audio clip to be used by the media content discovery system to identify a media content asset associated with the message content;
posting, by the media content discovery system, information associated with the message to the personalized destination within the media content consumption service for access by the additional user from within the media content consumption service, the posted information comprising the one of the photo image, the video clip, and the audio clip included in the message content;
receiving, by the media content discovery system, a request provided by the additional user from within the media content consumption service to access the information posted to the personalized destination;
providing, by the media content discovery system within the media content consumption service in response to the request, a personalized user interface that presents the posted information; and
wherein the posted information further comprises the media content asset identified as a result of a search for media content within the media content consumption service that is determined to be associated with the message content.

2. The method of claim 1, wherein the receiving of the message comprises receiving the message by way of a communication service that is included in the multiple communications services and that is separate from the media content consumption service.

3. The method of claim 2, wherein the communication service comprises one of a text messaging service, an email service, and a social networking service.

4. The method of claim 1, wherein the message comprises one of a short messaging service ("SMS") message, a media messaging service ("MMS") message, an email message, and a social networking service message.

5. The method of claim 1, wherein the media content consumption service comprises an Internet streaming video service.

6. The method of claim 1, further comprising presenting, by the media content discovery system within the personalized user interface, a first option configured to be selected by the additional user to add the media content asset to a list of media content assets that are of interest to the additional user and a second option configured to be selected by the additional user to not add the media content asset to the list of media content assets that are of interest to the additional user.

7. The method of claim 1, further comprising presenting, by the media content discovery system within the personalized user interface, an option configured to be selected by the additional user to access one or more supplemental search tools configured for use to define a supplemental search related to the posted information.

8. The method of claim 1, embodied as computer-executable instructions on at least one non-transitory computer-readable medium.

9. A method comprising:
receiving, by a media content discovery system from a user that has been granted permission by an additional user to send messages to a personalized destination of the additional user within a media content consumption service, a message that is for the additional user and that is addressed to the personalized destination, the personalized destination being addressable via multiple communication services utilizing different messaging platforms, the message having originated outside of the media content consumption service and including message content that comprises one of a photo image, a video clip, and an audio clip;
using, by the media content discovery system, the message content included in the message to search within the media content consumption service for media content assets associated with the message content;
posting, by the media content discovery system, data representative of a result of the search to the personalized destination within the media content consumption service for access by the additional user from within the media content consumption service, the data representative of the result of the search comprising a media content asset determined to be associated with the message content and identified as the result of the search; and
posting, by the media content discovery system, the one of the photo image, the video clip, and the audio clip included in the message content to the personalized destination within the media content consumption service for access by the additional user from within the media content consumption service.

10. The method of claim 9, wherein the posting of the data representative of the result of the search comprises posting a title of the media content asset.

11. The method of claim 9, further comprising providing, by the media content discovery system within the media content consumption service, a personalized user interface that presents the posted data representative of the result of the search for access by the additional user at the personalized destination.

12. The method of claim 9, embodied as computer-executable instructions on at least one non-transitory computer-readable medium.

13. A system comprising:
a processor communicatively coupled to a memory; and
a media service personalization facility that is communicatively coupled to the processor and that directs the processor to receive, from a user that has been granted permission by an additional user to send messages to a personalized destination of the additional user within a media content consumption service, a message that is for the additional user and that is addressed to the personalized destination, the personalized destination being addressable via multiple communication services utilizing different messaging platforms, the message having originated outside of the media content consumption service and including message content that comprises one of a photo image, a video clip, and an audio clip to be used to identify a media content asset associated with the message content, and post information associated with the message to the personalized destination within the media content consumption service for access by the additional user from within the media content consumption service, the posted information including the one of the photo image, the video clip, and the audio clip included in the message content; and a user interface facility communicatively coupled to the media service facility and that directs the processor to receive a request provided by the additional user from within the media content consumption service to access the information posted to the personalized destination; and provide, within the media content consumption service in response to the request, a personalized user interface that presents the posted information;

wherein the posted information further comprises the media content asset identified as a result of a search for media content within the media content consumption service that is determined to be associated with the message content.

14. The system of claim 13, wherein the message originated outside of the media content consumption service by way of a social networking service.

15. The system of claim 13, wherein the message content further comprises a text command that directs the media service personalization facility to perform a search for the media content asset associated with the message content.

16. The system of claim 13, wherein the user interface facility further directs the processor to present, within the personalized user interface, an option configured to be selected by the additional user to access one or more supplemental search tools configured for use to define a supplemental search related to the one of the photo image, the video clip, and the audio clip included in the message content.

* * * * *